United States Patent Office 3,404,904
Patented Oct. 8, 1968

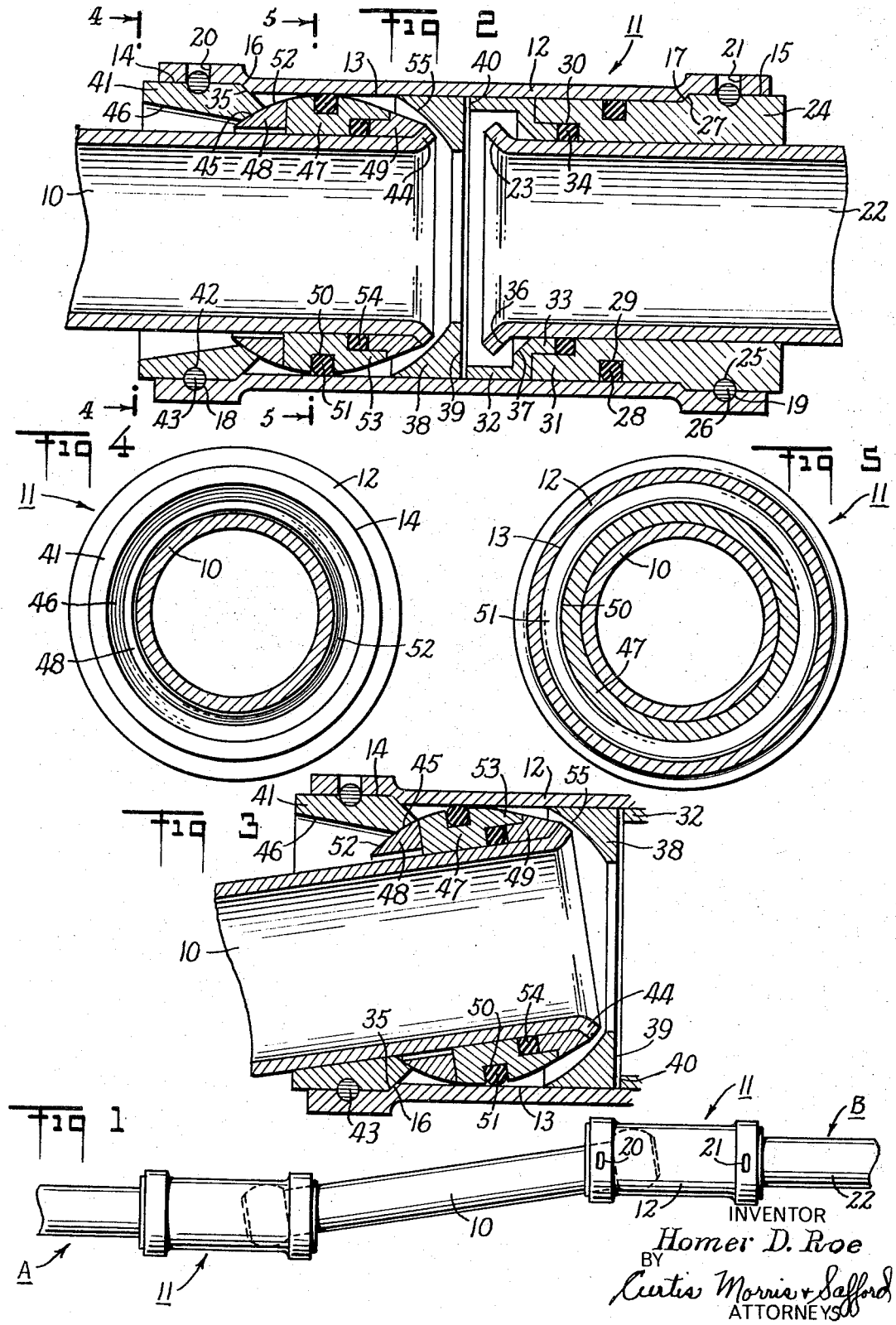

3,404,904
PIPE COUPLINGS
Homer D. Roe, c/o Holmberg, Inc.,
Melville, N.Y. 11746
Filed Jan. 17, 1966, Ser. No. 520,920
2 Claims. (Cl. 285—165)

ABSTRACT OF THE DISCLOSURE

A flexible demountable pipe coupling includes a cylindrical tubular casing operatively connected in a pipe line. A pipe extending into said casing through one end thereof includes an inner end portion operatively engaged coaxially in a composite pipe end positioning element which is mounted for angular flexing movement in the bore of said casing. Said element is an annular assembly having a generally spherical peripheral surface and comprises separate parts including an annular washer, an annular bushing and an annular sealing ring carrier mounted coaxially on said pipe between said washer and said bushing. A sealing ring is mounted on said carrier in sealing contact with opposed internal substantially cylindrical surface portions of the bore of said casing and another sealing ring provides a seal between the carrier and the tube. A second pipe extends coaxially through an opposed open end of the casing and is mounted for limited axial displacement therein.

---

The present invention relates to flexible pipe couplings.

Known forms of couplings of this kind include a type wherein a conduit or tube end extends into a ball or ball-like element which is operatively engaged in a socket provided in a casing which has a passageway in operative fluid passing communication with said end. In some embodiments, sealing rings are interposed between convex portions of spherical surface portions of the ball element and opposed concave portions of conforming spherical surface portions of the socket element. These so-called ball and socket, or universal joint couplings present difficulties in manufacture. For example, to attain a sufficiently close or sealing fit between interengaging ball and socket type surfaces involves contour machining both of the ball part and of the substantially hemispherical socket parts, operations in which it is difficult and costly to produce the necessary surface characteristics. Moreover, conventional hemispherical socket parts must be substantially perfectly mated to provide, when assembled, the needed freedom of movement of the ball part in relation thereto.

Also, in some types of couplings where seal rings are located in grooves between mated surfaces, high pressure within the coupling operating diametrically across the seal tend to impair the effectiveness of the seal or cause binding between the mated surfaces.

In a coupling and sealing structure where tolerances are necessarily limited, expansion of internal parts or the presence of dirt or resistant substances between the mating surface portions of ball and socket parts, for example, cause binding, or in some instances, scoring of the interengaged surfaces as well as impairment of the seal.

An object of the present invention has been to provide a flexible pipe coupling which can be manufactured economically; and which has superior effectiveness, durability and economy in use.

Other objects and distinctive features of the invention not above referred to will appear from the following description and claims and in the accompanying drawings wherein I have shown an illustrative embodiment which is described in this specification.

Summary of the invention

In general, a flexible demountable pipe coupling embodying my invention comprises a cylindrical tubular casing open at one end to receive an end portion of a pipe forming part of a fluid conducting system and which is provided with a terminal radially extending flange, said open end portion of the casing being of greater inside diameter than that of adjoining portions of said casing and being connected thereto by an inwardly exposed annular shoulder, a slidable sleeve having a tapered bore removably mounted coaxially in said enlarged end portion of the casing and having an inclined outwardly directed annular bearing face at its inner end engaging said shoulder and an inwardly directed annular bearing face disposed at an angle to and intersecting said outwardly directed face, and a composite bearing element slidably mounted coaxially on said pipe and comprising a washer having a spherical outer bearing surface engaging said inwardly directed bearing face of the sleeve, a bushing having a lateral face operatively engaging said flange of the pipe to retain said bushing thereon and a sealing ring carrier engaged between said washer and said bushing, a first sealing ring retained at the periphery of said carrier in sealing contact with portions of the casing bore at different angular positions of the pipe axis and a second sealing ring retained between said carrier and said bushing in sealing contact with the pipe. For axial flexibility at the pipe joint, the end of a second pipe extends into said casing in communication with the first pipe and in sealed relation to said casing, being mounted for limited axial displacement thereon.

In the drawings:

FIG. 1 is a plan view of a portion of a pipe line wherein flexible coupling means according to the invention are employed to operatively connect parts of such pipe line which are not in coaxial alignment;

FIG. 2, a central longitudinal section, on enlarged scale, showing a flexible coupling axially aligned with a connection to one end of a pipe line part;

FIG. 3, a central longitudinal section, on enlarged scale, showing a pipe line joint with the axis of portions of the flexible coupling deflected to an angular position in relation to the axis of an adjoining pipe line part;

FIG. 4, a transverse section, on enlarged scale, from the line 4—4 of FIG. 2; and FIG. 5 is a view similar to FIG. 4 but from the line 5—5 of FIG. 2.

As seen in FIG. 1 of the drawings, the axially non-aligned pipe portions A and B of a conduit, or pipe line, are operatively connected by a tube 10 cooperating with and forming in effect part of flexible coupling assemblies 11 which provide a useful range of axial and angular adjustment by which the flow from one of said pipe line portions to the other may be channeled in various directions and/or to facilitate shortening or elongation of a given pipe line length by a limited extent, with minimum interruption to service.

Referring to FIG. 2, the coupling 11 comprises an assembly which includes a cylindrical casing 12 open at its ends. The bore of said casing is formed to provide an intermediate cylindrical zone 13 of predetermined diameter, end zones 14 and 15 of greater diameter respectively, than the intermediate zone, and inclined annular shoulders, as 16, 17 between said respective end zones 14 and 15 and said intermediate zone 13. Said end zone 14 is formed with an inwardly exposed annular groove 18 and end zone 15 has an inwardly exposed annular groove 19. Casing 12 is provided with an opening 20 into groove 18 and an opening 21 into groove 19 for a purpose to be explained.

In the form of coupling shown in FIG. 2, i.e. one capable of limited adjustment axially as well as angularly, an operative connection with a pipe line B, for example, includes a cylindrical tube 22 provided with a peripheral flange 23 at its inner end.

Tube 22 is slidably mounted in a sleeve 24 which is slidably fitted in casing 12 and having a peripheral groove 25 positioned opposite to and in register with groove 19 in the casing. A flexible locking element 26 of suitable character is insertable into and removable from said opposed grooves 19, 25 through opening 21 and, when in operative position in said grooves, releasably interlocks casing 12 with sleeve 24.

Said sleeve 24 has a peripheral outwardly directed annular shoulder 27 which, when the parts are assembled, bears against inwardly directed shoulder 17 of the casing to limit the extent of inward movement, left FIG. 2, of sleeve 24.

A sealing ring 28 of suitable resilient material is lodged in a peripheral annular channel 29 of sleeve 24 being positioned therein with its exposed peripheral surface in operative sealing engagement with the intermediate zone 13 of the casing bore.

The inner end of sleeve 24 is formed with an annular recess 30 encircled by an inwardly extending annular flange 31. An annular stop ring 32 slidably arranged in the intermediate bore zone 13 includes an outwardly extending annular flange 33 which telescopes into the recess 30 in a manner to retain a sealing ring 34 in operative sealing contact with and between tube 22 and flange 31 of sleeve 24.

The peripheral annular flange 23 at the inner end opening of tube 22 is arranged with its outer, right FIG. 2, annular face 36 in opposed relation to inner annular face 37 of stop ring 32 thereby to limit the extent of outward axial displacement of tube 22 in relation to the casing 12 and sleeve 24.

Inward axial displacement of said tube 22 is limited by annular stop ring 38 slidably mounted in the intermediate bore zone 13 of casing 12 and having an outwardly directed face 39 of which peripheral portions abut against the annular inner end face 40 of stop ring 32.

Stop rings 32 and 38 may be viewed in effect as floating stop means to the extent that they are capable of limited axial movement or adjustment in zone 13 of the casing bore. The parts described above and shown in FIG. 2 at the right of ring 38 are related more particularly to the axial adjustment function of the coupling. The angular adjustment function thereof is effected by parts seen at the left, FIG. 2, of the coupling, and in FIG. 3.

As seen in said figures, a sleeve 41 is slidably fitted in the open end (left) and in end zone 14 of the casing bore. An outwardly directed peripheral annular groove 42 in sleeve 41 is in register with said opposed inwardly directed groove 18 in casing 12. Said opening 20 into groove 18 permits insertion and removal of a suitable flexible locking element, as 43, into the passageway provided by and between said grooves 18 and 42.

The inner end of tube 10 which, in the illustrated embodiment, is shown as in fluid passing communication through the casing bore with the inner end of tube 22, is mounted for angular movement in casing 12, being operatively engaged at its inner end with a composite supporting element, shown in FIG. 3 as comprising three separate co-operating parts slidably carried coaxially on and at an inner end portion of tube 10 adjacent to the terminal peripheral annular flange 44 of said tube 10.

An inner end portion of sleeve 41 presents an inwardly exposed annular bearing face 45, FIG. 3, which is intersected by the inner or narrower end of the truncated conical bore 46 of sleeve 41. For practical purposes, said bore may advantageously be tapered at an angle of approximately 4° to the longitudinal axis of sleeve 41 thus permitting a total angular deflection of tube 10 in the casing of approximately 8°. An inner end portion of sleeve 41 also includes an inclined annular face forming a shoulder 35 positioned to bear against the opposed stop shoulder 16 of the casing to limit the extent of inward movement of sleeve 41 which is locked in assembled position by the flexible locking element 43, as above described.

The three part tube end supporting assembly above referred to includes an annular seal ring carrier 47 slidably mounted on tube 10 between a washer 48 and a bushing 49 also slidably mounted on said tube 10. Carrier 47 is provided with a peripheral channel 50 which laterally retains a sealing ring 51 of appropriate resilient material. The arrangement is such that exposed peripheral portions of said ring 51 bear yieldingly on and in sealing contact with adjacent portions of zone 13 of the casing bore at all operative positions of tube 10 therein.

The tube supporting assembly not only has freedom for limited rotational and axial movement on tube 10 but also has freedom for limited rotational and angular movement in relation to the bearing face 45 of sleeve 41. Thus, the annular washer 48 provides an outwardly exposed bearing surface 52 which, in use, rides freely on inwardly exposed bearing surface 45 of sleeve 41 when the tube is moved angularly in casing 12. It is noted that the internal diameter of washer 48 is sufficiently greater than the outside diameter of tube 10 and the inside diameter of carrier 47 to allow limited transverse sliding movement or adjustment between the flat inner or transverse face of washer 48 and the opposed flat outer transverse face of carrier 47.

Said carrier 47 includes an inwardly extending annular flange 53 which defines a cylindrical seal receiving recess between said flange and opposed portions of the peripheral surface of tube 10. A sealing ring 54 of suitable dimensions and resilient material is lodged in said recess where it is laterally confined by bushing 49 in coaxial sealing contact with tube 10. Bushing 49 is retained in said operative ring confining or retaining position by said flange 44 at the inner end of tube 10. As seen in FIGS. 2 and 3, the stop ring 38 includes an outwardly exposed surface 55 of approximately spherical axial contour disposed opposite flange 44 at all operative positions of tube 10. The clearance between said surface 55 and inner end surface portions of flange 44 is such as to allow limited inward axial movement of tube 10 while permitting free angular and rotational sliding movement of said inner end on said surface 55.

From the foregoing description considered in connection with the drawings, it will appear that the coupling therein referred to presents no special technical problems and requires no special procedures in manufacture which would tend unduly to increase production costs. Also, the steps of assembly and installation are flexible and can be varied to meet a wide range of practical conditions. Thus, certain of the parts may be preassembled, as on tube 10, in the shop, or may in many instances be assembled on the job, depending in part on the character, i.e. malleability of tube 10. If said tube is of relatively rigid material a power machine or other expedient may be needed to produce the flanges 23 or 44; whereas if the material of tube 10 is of malleable copper, or the like, these flanges may be formed on the job by the use of appropriate hand tools.

In installations involving special conditions, as high pressure, extreme temperatures, or fluids having different degrees of fluidity or carrying dirt or abrasvie particles, it is essential or at least highly desirable to maintain effective sealing against leakage. The above described coupling embodies features which promote the maintenance of effective sealing under a wide range of operating conditions. Thus, it is noted that sealing ring 51 maintains operative sealing contact with the straight cylindrical inner surface of casing 12 not only in the central or FIG. 2 position where it may remain substantially circular in cross section, but also in the extreme deflected position, FIG. 3, where it may be slightly distorted toward an elliptical sectional contour. An advantage of this sealing arrangement is that the ring is not unduly flattened or impaired by pressure operating within the casing. Also, any wear or abrasion on the interengaging surfaces 45 of the sleeve 41 and 52 of the washer 48, is per se without harmful effect on the sealing of the interior of casing 12 against leakage to the outside. Nor is strict concentricity or conformability between said surfaces required; nor, are the opposed surface characteristics of these parts critical in respect to sealing effectiveness even though surface 45 receives practically all mechanical thrust loading generated in the casing.

The features just above considered also preclude mechanical binding of the internal parts due to normal expansion thereof under heat, pressure etc., or under abnormal conditions. Indeed, the sealing effect of ring 51 in relation to casing 12 can increase with increased pressure and without binding.

A further advantageous feature of the illustrated coupling resides in the arrangement whereby casing 12 can be displaced endwise for ready access to the internal parts above described. Thus, assuming the need to inspect, replace or repair any such parts, the locking elements 26 and/or 43 may be readily withdrawn from locking position to release the casing. If access more particularly to the parts assembled on tube 22 is desired, casing 12 along with sleeve 41 will be displaced to the left, FIG. 2, sufficiently to expose the parts engaged on tube 22 so that said parts can then be removed, cleaned, repaired or replaced. Similarly, by sliding casing 12 to the right, FIGS. 2 and 3, parts engaged on tube 10 become accessible. The composite character of the tube mounting element which comprises parts 47, 48 and 49 permits the use of different materials in the production of said parts, if desired, such as non-corrosive aluminum or the like for one or more of said parts, or hard material, as steel, for another or others. Also, it is contemplated that the interior or bore surface of casing 12 may advantageously be coated with Teflon, or otherwise appropriately treated, to render it more effective in operation, as by resisting corrosion or providing lubrication.

I claim:
1. A demountable flexible pipe coupling comprising
   (a) an open end tubular casing operatively engaged on a pipe and having a substantially cylindrical bore therethrough, said casing including an end portion of enlarged diameter connected by an inclined annular shoulder to an adjacent portion of smaller diameter,
   (b) said pipe having an end portion extending into said casing through said open end thereof and having a terminal peripheral radially outwardly extending annular flange and being coaxially engaged in a composite annular pipe end positioning bearing element having a generally spherical peripheral radial contour and being mounted for angular movement therein,
   (c) said element including a washer having a peripheral spherical bearing face, a bushing and an annular sealing ring carrier slidably mounted coaxially on said pipe and operatively retained between said washer and said bushing,
   (d) a first sealing ring peripherally mounted on said carrier and operatively positioned in effective sealing contact with and between said carrier and opposed internal substantially cylindrical surface portions of the bore of said casing,
   (e) a removable sleeve mounted coaxially in said enlarged end of said casing bore and means to retain said sleeve in said enlarged end of said casing, said sleeve having an inclined annular face at its inner end engaging said annular shoulder of the casing and an annular spherical face at its inner end in sliding contact with said peripheral spherical bearing surface of said washer retaining said pipe end positioning element against outward axial displacement in relation to said pipe and said casing, the bore of said sleeve being of truncated conical contour diminishing in diameter from its outer toward its inner end to define the extent of angular deflection of the pipe and said pipe end positioning element in relation to the longitudinal axis of said casing, said coupling being so constructed and arranged so that said spherical bearing face of said sleeve contacts only said spherical bearing face of said washer during all angular movement of said pipe and bearing element relative to said casing,
   (f) said washer being operatively interposed between the sealing ring carrier and said sleeve,
   (g) said bushing being operatively positioned coaxially on the pipe between said terminal flange thereof and said sealing ring carrier, and
   (h) a second sealing ring operatively positioned between said bushing and said carrier in operative sealing contact with said pipe and annular stop means positioned in said casing adjacent said pipe end limiting inward axial movement of said pipe end in said casing.

2. A demountable flexible pipe coupling according to claim 1 and wherein a second pipe end extends into another open end of the casing and is mounted for limited axial displacement therein, a second sleeve surrounding said second pipe and mounted in said casing, said second sleeve slidably receiving said second pipe end and locking means operatively arranged between inner surface portions of said casing and outer surface portion of said second sleeve, respectively, for releasably retaining the latter in operative position in the casing, and means on said second pipe retaining said second pipe in said second sleeve and said annular stop means in said casing operatively positioned between the opposed inner ends of said pipes to limit axial movement of said second pipe end in the casing and sealing means sealingly positioned between said casing and said second sleeve and between said second pipe and said second sleeve.

References Cited
UNITED STATES PATENTS

| | | | |
|---|---|---|---|
| 554,255 | 2/1896 | Friedmann | 285—164 |
| 1,500,921 | 7/1924 | Bramson et al. | 285—166 |
| 2,175,550 | 10/1939 | Neebe | 285—164 |
| 2,556,659 | 6/1951 | Patterson | 285—164 |
| 3,127,199 | 3/1964 | Roe | 285—165 |
| 3,306,636 | 2/1967 | Hereth | 285—165 X |

FOREIGN PATENTS

| | | |
|---|---|---|
| 24,548 | 6/1906 | Austria. |
| 873,898 | 4/1942 | France. |
| 1,397,378 | 3/1965 | France. |
| 878,602 | 10/1961 | Great Britain. |

CARL W. TOMLIN, *Primary Examiner.*

DAVE W. AROLA, *Assistant Examiner.*